United States Patent
Lee et al.

(10) Patent No.: US 10,427,489 B2
(45) Date of Patent: Oct. 1, 2019

(54) HVAC APPARATUS FOR AUTOMOTIVE VEHICLE

(71) Applicants: Hyundai Motor Company, Seoul (KR); Kia Motors Corporation, Seoul (KR); Hanon Systems, Daejeon (KR)

(72) Inventors: Yoon-Hyung Lee, Seoul (KR); Byeong-Moo Jang, Suwon-si (KR); Myung-Hun Kang, Jeonju-si (KR); Jong-Sik Bae, Suwon-si (KR); Gyu-Ik Han, Daejeon (KR); Jae-Woo Ko, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 0 days.

(21) Appl. No.: 15/809,076

(22) Filed: Nov. 10, 2017

(65) Prior Publication Data
US 2018/0162192 A1    Jun. 14, 2018

(30) Foreign Application Priority Data
Dec. 14, 2016    (KR) .................... 10-2016-0170745

(51) Int. Cl.
*F24F 7/00*        (2006.01)
*B60H 1/00*       (2006.01)

(52) U.S. Cl.
CPC ....... *B60H 1/00064* (2013.01); *B60H 1/0005* (2013.01); *B60H 1/00692* (2013.01); *B60H 2001/002* (2013.01); *B60H 2001/006* (2013.01); *B60H 2001/00092* (2013.01); *B60H 2001/00128* (2013.01); *B60H 2001/00135* (2013.01)

(58) Field of Classification Search
CPC .. B60H 1/00064; B60H 1/10; B60H 1/00692; B60H 1/34; B60H 2001/00092; B60H 2001/00128; B60H 2001/2001; B60H 2001/00135; B60H 2001/002; B60H 2001/006; B60H 1/00785; F24F 13/14
USPC ......................................................... 165/59
See application file for complete search history.

(56) References Cited

U.S. PATENT DOCUMENTS

| 2004/0192185 A1* | 9/2004 | Le ..................... B60H 1/00064 454/156 |
| 2012/0215402 A1* | 8/2012 | Kanemaru ......... B60H 1/00785 701/36 |
| 2013/0306298 A1* | 11/2013 | Rothenhauser ......... F24F 13/14 165/204 |

FOREIGN PATENT DOCUMENTS

KR    10-2001-0108763 A    12/2001

* cited by examiner

*Primary Examiner* — Davis D Hwu
(74) *Attorney, Agent, or Firm* — Morgan, Lewis & Bockius LLP (57) ABSTRACT

A heating, ventilation, and air conditioning (HVAC) apparatus for an automotive vehicle may include an internal volume divided into upper and lower regions, and configured for blowing the air to a defrost vent and a front seat face vent is made through the upper region, and blowing the air to a front seat foot vent and a rear seat vent is made through the lower region.

14 Claims, 11 Drawing Sheets

HVAC APPARATUS FOR AUTOMOTIVE VEHICLE

CROSS-REFERENCE(S) TO RELATED APPLICATIONS

The present application claims priority to Korean Patent Application No. 10-2016-0170745, filed on Dec. 14, 2016, the entire contents of which is incorporated herein for all purposes by this reference.

BACKGROUND OF THE INVENTION

Field of the Invention

The present invention relates to a heating, ventilation, and air conditioning (HVAC) apparatus, and more particularly, to an HVAC apparatus disposed in a vehicle and configured to perform functions including cooling, heating, and air ventilation of the internal of the vehicle.

Description of Related Art

The HVAC apparatus refers to an apparatus configured for maintaining conditions including temperature, humidity, etc. of a closed environment in a proper state. Automotive vehicles are provided with an air conditioner for cooling, heating, and ventilation. The term "heating, ventilation, and air conditioning (HVAC) apparatus" refers to such an air conditioner.

Such an HVAC apparatus performs a function by repeating processes of compressing, condensing, expanding, and evaporating refrigerant by a compressor configured to compress, a condenser configured to condense, an evaporator configured to evaporate, etc.

A conventional HVAC apparatus for an automotive vehicle adopted a single-zone control system which controls the overall internal of the vehicle at a single temperature, or a dual-zone control system which controls a temperature of a driver seat side and a temperature of a passenger seat side independently. In recent years, a triple-zone control system for additionally controlling a temperature of a rear seat side of the vehicle, as well individually, has been researched and developed.

Figure 1:
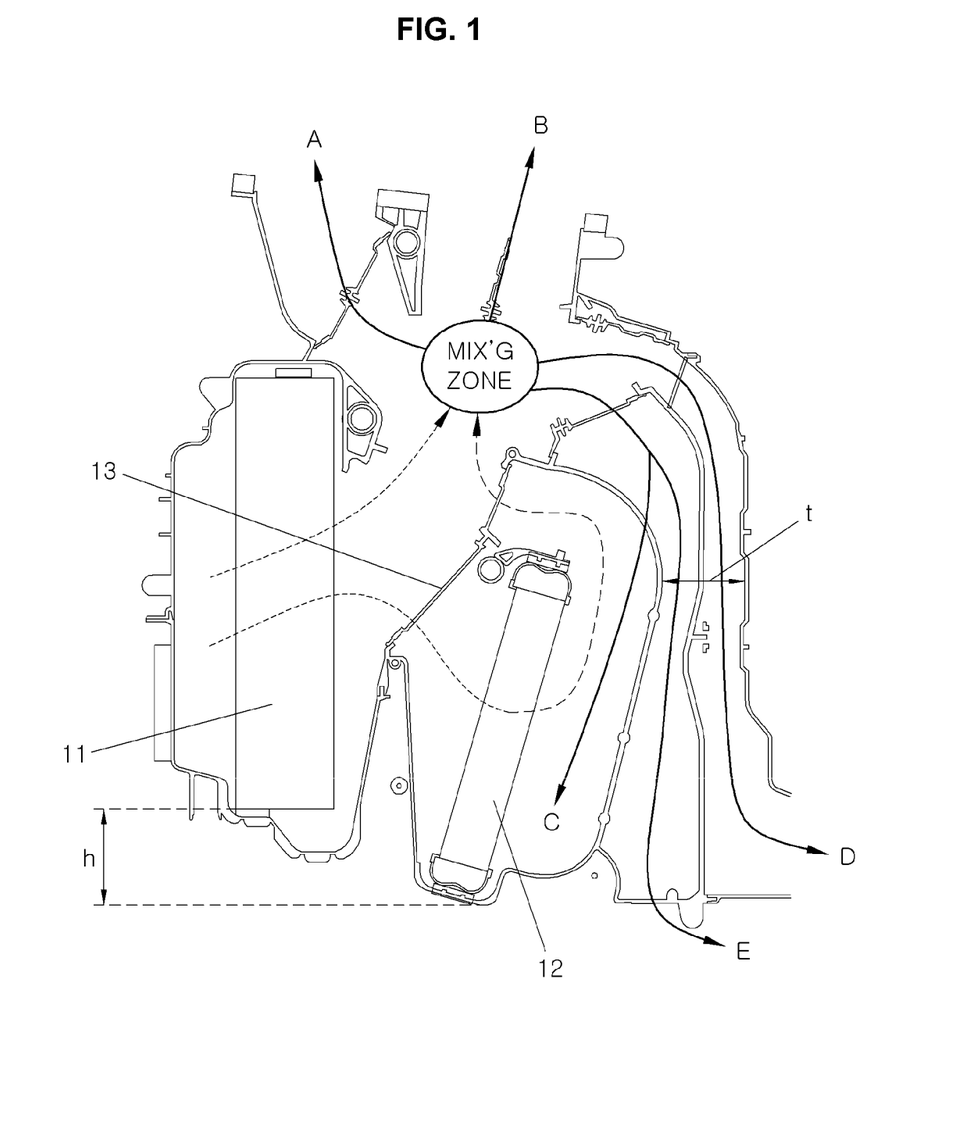
FIG. 1 shows an example of a conventional HVAC apparatus.

FIG. 1 shows an example of a conventional triple-zone control system.

The conventional triple-zone control system is a single mixing type in that the air for the front seat and the rear seat of the vehicle passes through one mixing zone.

In the present HVAC apparatus, when the air cooled by an evaporator 11 passes through a heat exchanger 12 under the control of a temperature door 13, the air becomes warm air, whereas when the air cooled by the evaporator does not pass through the heat exchanger, the air maintains the cool temperature. In addition, it is possible to control the temperature to a desired temperature by allowing cold air and hot air to be mixed in a mixing zone according to the opening degree of the temperature door 13.

The air passing through the mixing zone is blown to a defrost vent A, a front seat face vent B, a front seat foot vent C, and a rear seat vent including a rear seat face vent D and a rear seat foot vent E, which are controlled by respective doors.

However, since such a conventional HVAC apparatus is a type in which the air is blown to all the front seat face vent, the front seat foot vent and the rear seat vent through a single mixing zone, there are problems in that it has many inflections and a long "S"-shape, and hence passage resistance is excessive.

Therefore, the vents C, D, and E, which discharge the air to a lower side, are of a structure in which the air ascends once and then descends.

Figure 2:
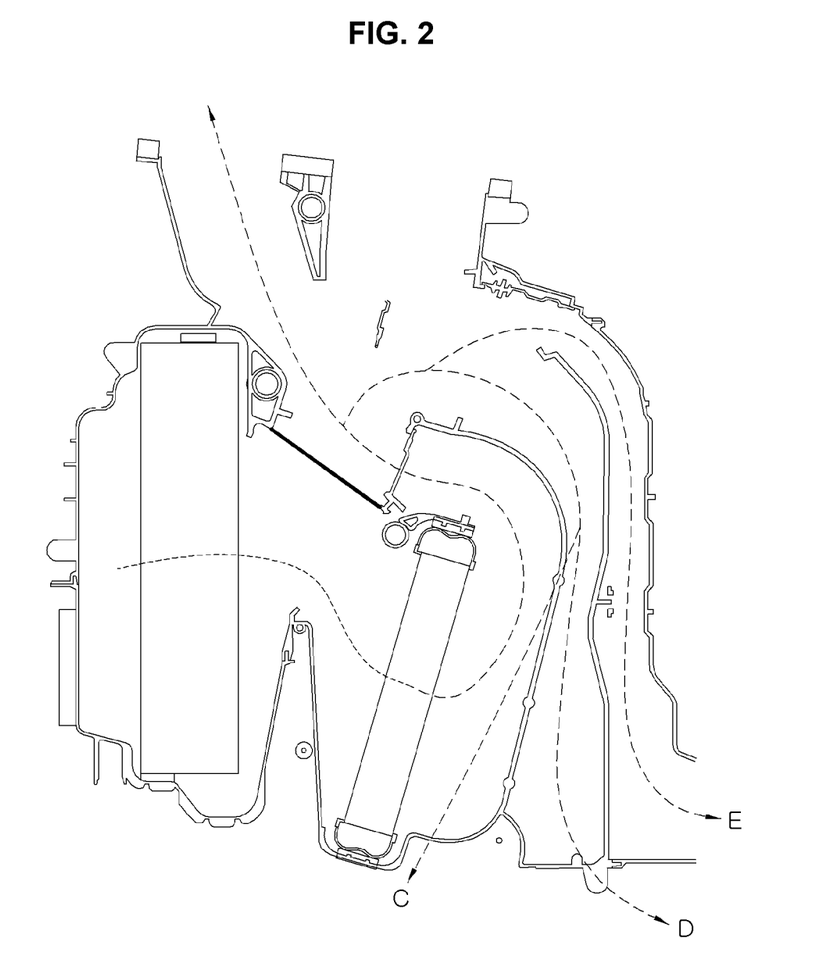
FIG. 2, FIG. 3, and FIG. 4 show flow paths for each mode in a conventional HVAC apparatus.
Figure 3:
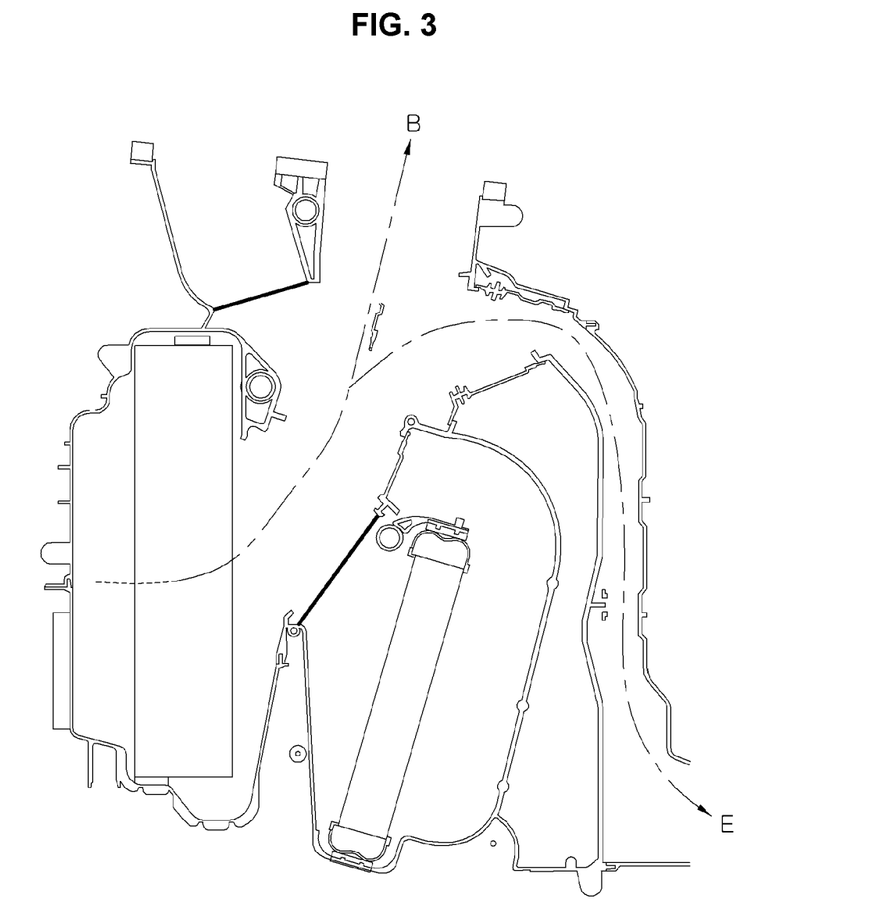
Figure 4:
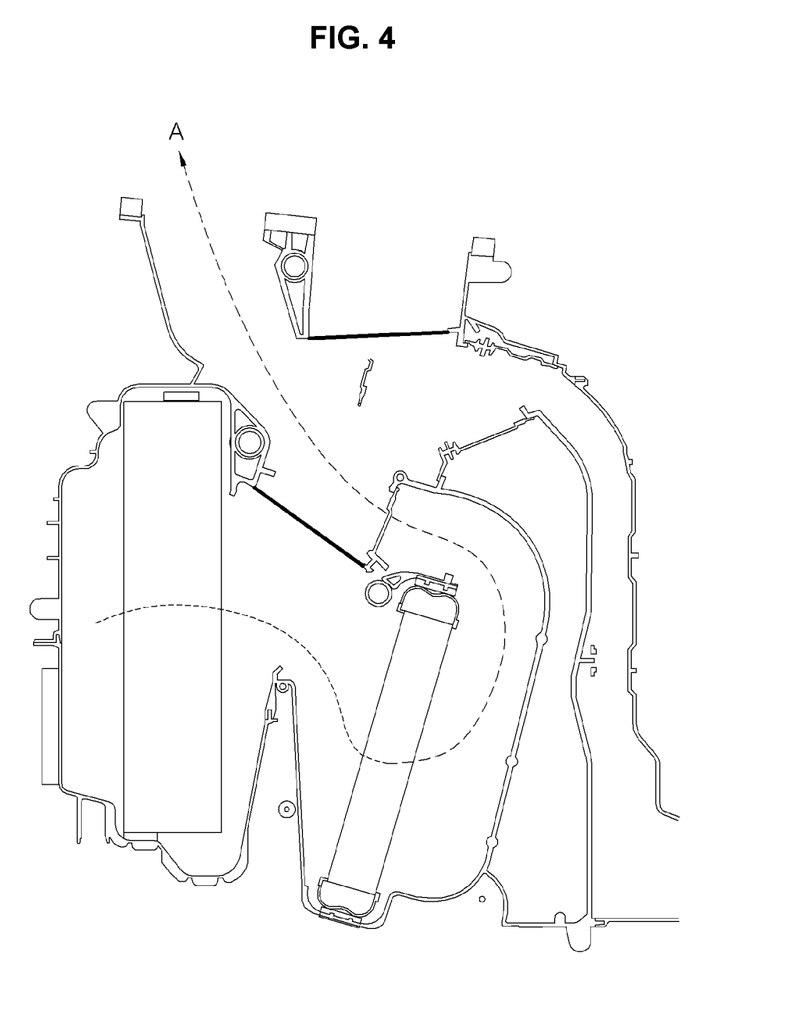

FIG. 2, FIG. 3, and FIG. 4 show flow paths according to the respective modes wherein FIG. 2 corresponds to a foot mode, FIG. 3 corresponds to a face mode, and FIG. 4 corresponds to a defrost mode.

As shown in FIG. 2, the flow paths to the front seat foot vent C, the rear seat face vent D, and the rear seat foot vent E are very disadvantageous due to their 'S'-shapes having many inflections.

Further, as shown in FIG. 3, the flow path to the rear seat foot vent E is very disadvantageous because it is long.

Furthermore, as shown in FIG. 4, the flow path toward a window vent A is also disadvantageous because it has many inflections.

As the flow paths are disadvantageous as mentioned above, passage resistance becomes higher, air volume is decreased, and air conditioning noise becomes worse.

In addition, since the output of a motor may be increased to increase the air volume, fuel economy of the vehicle is inevitably lowered.

On the other hand, since flow paths to the vents for the rear seat are disposed doubly and transversely, a thickness t is inevitably increased due to the double flow paths, which increases a size and weight of a casing.

Further, a heat exchanger 12 is disposed at a lower side located h lower than an evaporator 11, which also increases the size of the casing and hence makes vehicle package disadvantageous.

The information disclosed in the present Background of the Invention section is only for enhancement of understanding of the general background of the invention and should not be taken as an acknowledgement or any form of suggestion that the present information forms the prior art already known to a person skilled in the art.

BRIEF SUMMARY

Various aspects of the present invention are directed to providing an HVAC apparatus for an automotive vehicle having advantages that by improving flow paths, passage resistance is superior, air volume is not lowered, air conditioning noise is improved, and the size and weight of a casing are reduced.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an HVAC apparatus for an automotive vehicle wherein an internal volume is divided into upper and lower regions, blowing the air to a defrost vent and a front seat face vent is made through the upper region, and blowing the air to a front seat foot vent and a rear seat vent is made through the lower region.

Further, cold air passing through an evaporator and warm air passing through a heat exchanger are mixed in each of the upper and lower regions.

Further, in an exemplary embodiment of the present invention, the heat exchanger is configured as a heater.

A horizontal partition wall is formed at a height at which the heat exchanger is bisected.

The apparatus further includes an upper temperature door disposed at a front end portion of the heat exchanger in the upper volume configured to regulate inflow of air into the heat exchanger, and a lower temperature door disposed at a front end portion of the heat exchanger in the lower volume configured to regulate inflow of air into the heat exchanger.

The upper and lower temperature doors are configured to slide in an upward and downward direction to open or close the flow path to the heat exchanger.

In the present case, the upper temperature door becomes closer to the heat exchanger as the upper temperature door moves further downward.

Further, the upper and lower temperature doors are formed at their sides with elastic guide portions respectively to eliminate a clearance between the temperature door and a guide for guiding the temperature door up and down.

The elastic guide portions are configured to protrude and have a hole formed therein.

Further, partition walls for supporting the heat exchanger are formed at top and bottom end portions of the heat exchanger wherein the apparatus further includes a backflow prevention guide configured to extend and curve upward from the partition wall at the top end portion thereof.

The apparatus may further include a heat conduction prevention guide configured to be separated from the partition wall at the bottom end portion to prevent heat of the heat exchanger from being transferred to the lower side.

In accordance with another aspect of the present invention, there is provided an HVAC apparatus for an automotive vehicle, in which an internal volume in which an evaporator and a heat exchanger are disposed is formed, a horizontal partition wall for partitioning the internal volume into upper and lower regions is formed, and cold air passing through the evaporator and warm air passing through the heat exchanger are mixed in each of the upper and lower regions independently, wherein the apparatus may include an upper temperature door disposed at a front end portion of the heat exchanger in the upper region configured to regulate inflow of air into the heat exchanger; a lower temperature door disposed at a front end portion of the heat exchanger in the lower region configured to regulate inflow of air into the heat exchanger; a defrost door configured for adjusting the blowing of the air to the defrost vent; a front seat face door configured for adjusting the blowing of the air to the front seat face vent; and a rear seat door configured for adjusting blowing of the air to the rear seat vent.

The upper temperature door becomes closer to the heat exchanger as the upper temperature moves further downward.

Further, the upper and lower temperature doors are formed at their sides with elastic guide portions respectively to eliminate a clearance between the temperature door and a guide for guiding the temperature door up and down, wherein the elastic guide portions are configured to be protruded and have a hole formed therein.

Further, partition walls for supporting the heat exchanger are formed at top and bottom end portions of the heat exchanger wherein the apparatus further includes a backflow prevention guide formed to extend and curve upward from the partition wall at the top end portion thereof, and a heat conduction prevention guide formed to be separated from the partition wall at the bottom end portion to prevent heat of the heat exchanger from being transferred to the lower side.

According to the HVAC apparatus for an automotive vehicle of the present invention, there is less inflection in the flow paths and the passage resistance can be reduced by forming two mixing zones, with the result that noise can be reduced and fuel economy of the vehicle can also be enhanced.

In addition, the size of the HVAC apparatus can be effectively reduced, which is advantageous to the vehicle package.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientation, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives modifications, equivalents and other embodiments, which may be included within the spirit and scope of the invention as defined by the appended claims.

In describing the exemplary embodiments, detailed description of technology known in the art or iterative description may be made shortly or omitted to avoid obscuring the subject matter of the present invention.

Figure 5:
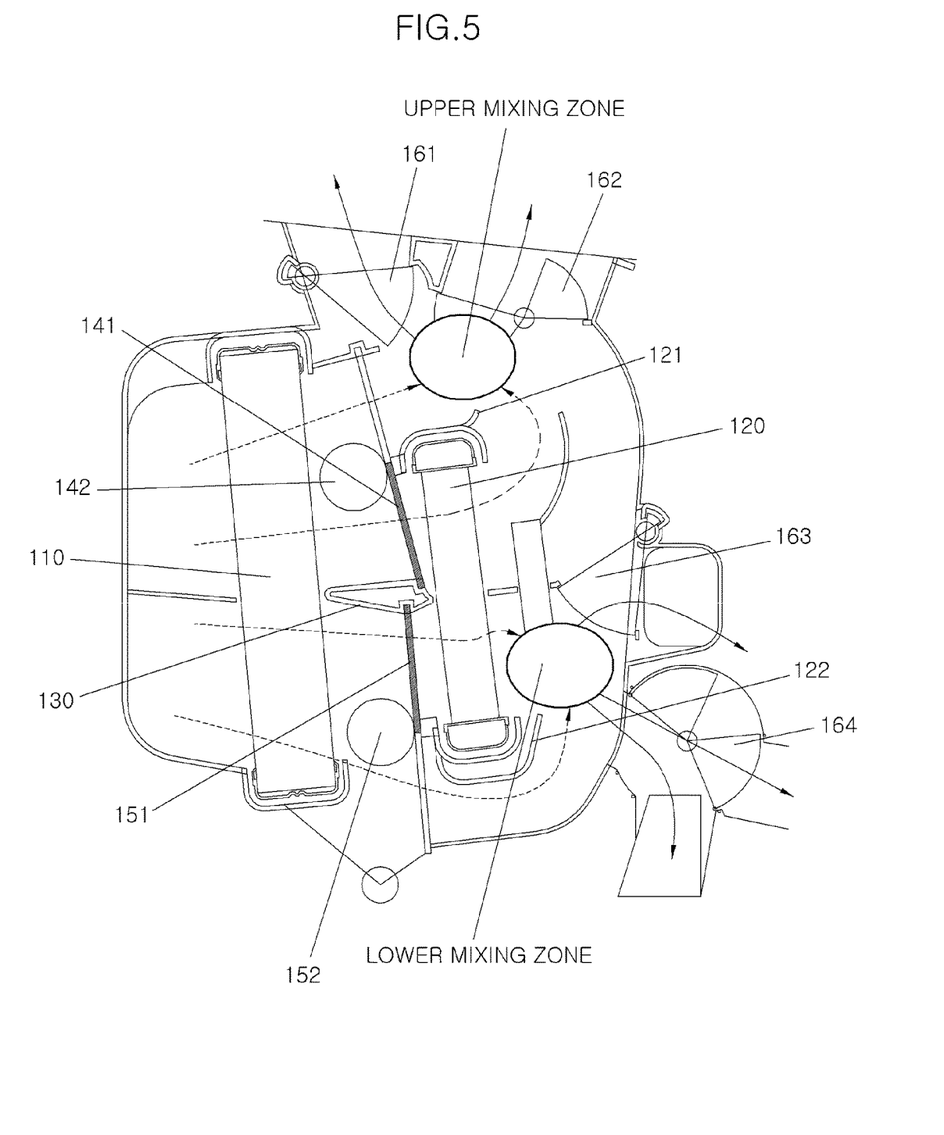
FIG. 5 is a schematic view illustrating a cross-section of an HVAC apparatus for an automotive vehicle according to an exemplary embodiment of the present invention.
Figure 6:
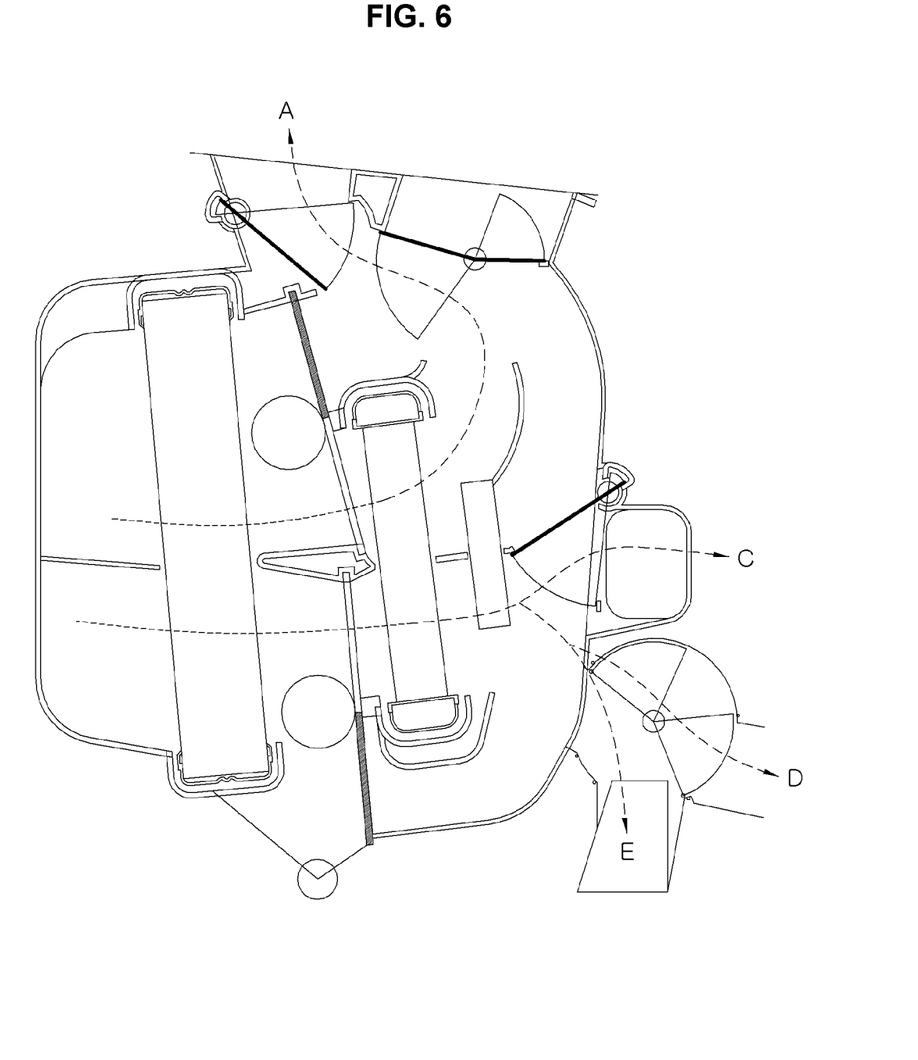
FIG. 6, FIG. 7, and FIG. 8 show flow paths for each mode in an HVAC apparatus for an automotive vehicle according to an exemplary embodiment of the present invention.
Figure 7:
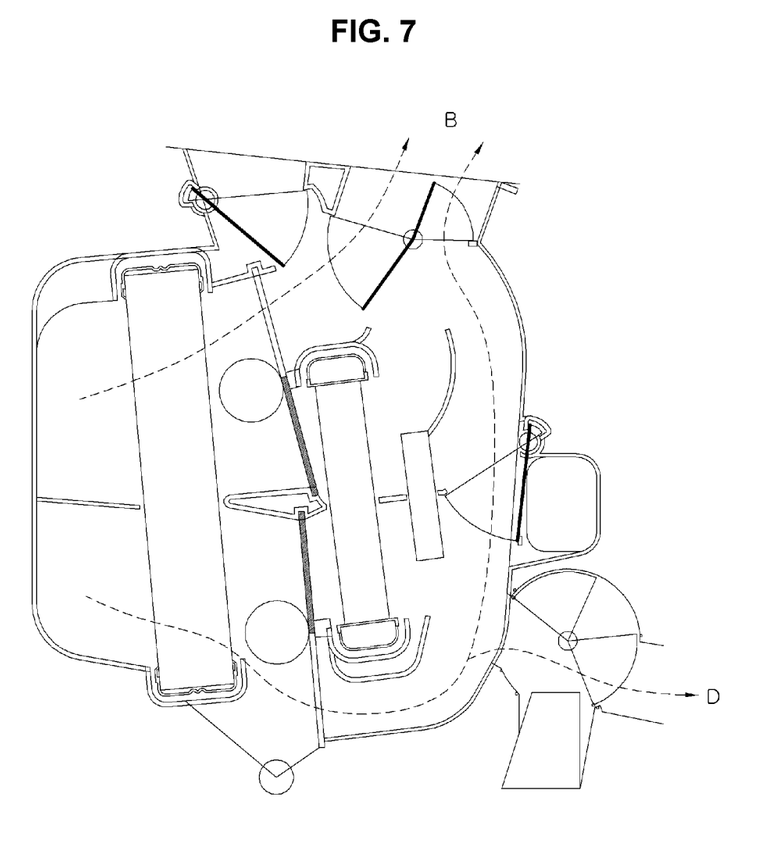
Figure 8:
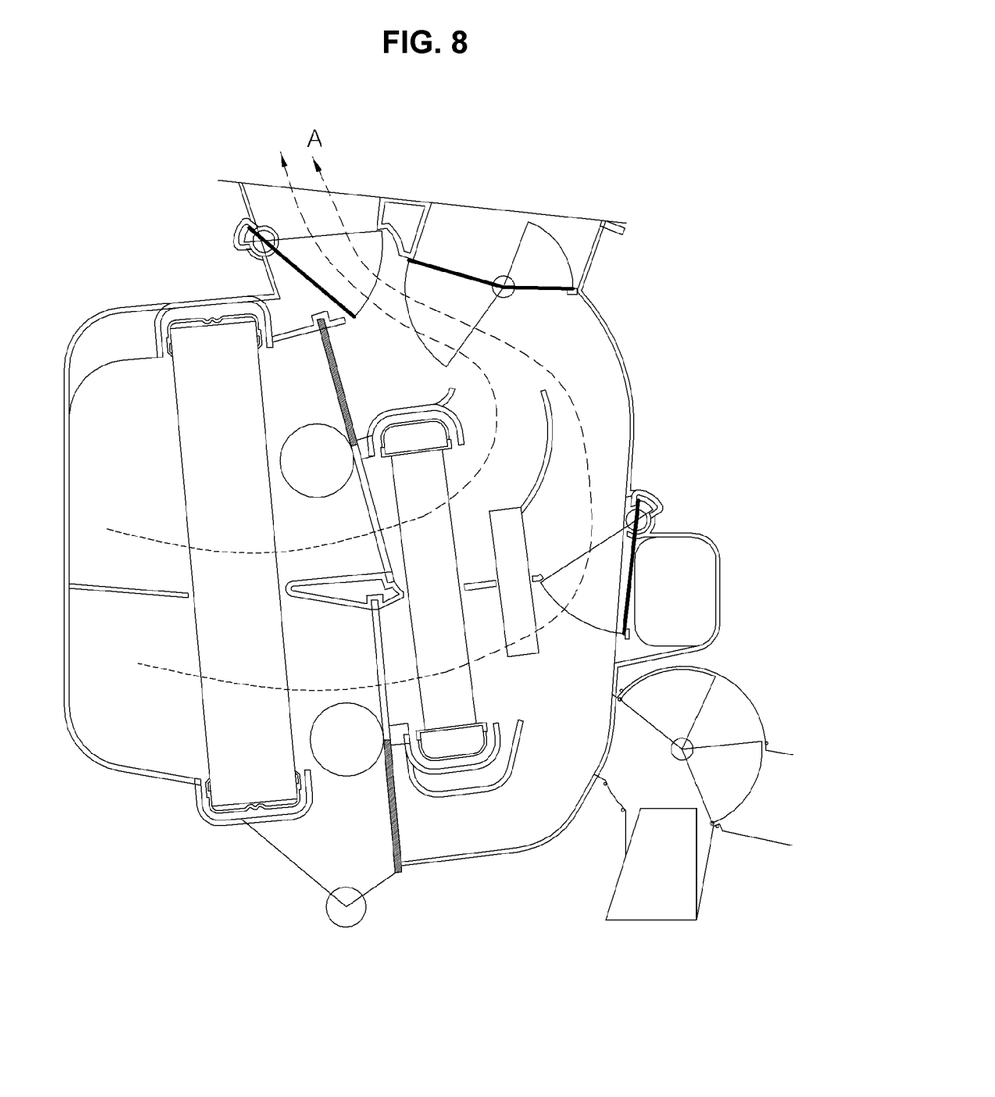

FIG. 5 is a schematic view illustrating a cross-section of an HVAC apparatus for an automotive vehicle according to an exemplary embodiment of the present invention, and FIG. 6, FIG. 7, and FIG. 8 show flow paths for each mode in an HVAC apparatus for an automotive vehicle according to an exemplary embodiment of the present invention.

Hereinafter, an HVAC apparatus for an automotive vehicle according to an exemplary embodiment of the present invention will be described with reference to FIG. 5, FIG. 6, FIG. 7, and FIG. 8.

The HVAC apparatus according to an exemplary embodiment of the present invention improves air conditioning performance by partitioning an internal volume vertically to separate upper and lower flow paths from each other and form mixing zones in upper and lower regions respectively and in turn simplifying the flow paths. In addition, it is also advantageous to the vehicle package because such constitution results in reducing the size and weight of a casing.

The HVAC apparatus according to an exemplary embodiment of the present invention blows cold air by allowing the air blowing through a blower to pass through an evaporator 110 and warm air by allowing the air blowing through the blower to pass through temperature doors 141 and 151 as well as a heat exchanger 120.

In an exemplary embodiment of the present invention, the heat exchanger 120 is configured as a heater.

Further, to form two mixing zones, a horizontal partition wall 130 for partitioning the internal volume into upper and lower regions is formed.

Therefore, the air blowing into the upper region through the upper mixing zone is controlled to be blown to a defrost vent by a defrost vent door 161 and to a front face vent by a front seat face door 162.

On the other hand, the air blowing into the lower region through the lower mixing zone is controlled to be blown to a front seat foot vent by a front seat foot door 163 and to a rear seat vent by a rear seat door 164.

For both the upper air and the lower air to pass through the heat exchanger 120, the horizontal partition 130 may be formed at a height at which the heat exchanger 120 is bisected.

An upper temperature door 141 is disposed at a front end portion of the heat exchanger 120 to control the degree that the air introduced into the upper side flows into the heat exchanger 120, while a lower temperature door 151 is disposed at a front end portion of the heat exchanger 120 to control the degree that the air introduced into the lower side flows into the heat exchanger 120.

Such temperature doors are preferably configured to engage with door gears 142 and 152 to be open or closed in a sliding manner.

FIG. 6 illustrates a flow path in the case where the HVAC apparatus is operated in a foot mode wherein the temperature doors are open wherein air inflow to the heat exchanger side is allowed.

As shown in FIG. 6, hot air is supplied through a window vent A, a front seat foot vent C, a rear seat face vent D, and a rear seat foot vent E.

In the present case, it was confirmed that passage resistance was reduced by 31% compared to that in the conventional flow path as shown in FIG. 2.

FIG. 7 illustrates a flow path in the case where the HVAC apparatus is operated in a face mode wherein the temperature doors are closed wherein air inflow to the heat exchanger side is not allowed.

As shown in FIG. 7, cold air is supplied to the front seat face vent B and the rear seat face vent D. In the present case, it was confirmed that passage resistance was reduced by 27% compared to that in the conventional flow path as shown in FIG. 3.

FIG. 8 illustrates a flow path in the case where the HVAC apparatus is operated in a defrost mode wherein the temperature doors are open wherein air inflow to the heat exchanger side is allowed.

As shown in FIG. 8, hot air is supplied to the window vent A. In the present case, it was confirmed that passage resistance was reduced by 23% compared to that in the conventional flow path as shown in FIG. 4.

As described above, in the HVAC apparatus according to an exemplary embodiment of the present invention, as the upper and lower flow paths are separated and individual mixing zones are formed in the upper and lower regions respectively and hence the flow paths are simplified, passage resistance is reduced, with the result that noise performance is improved and fuel economy of the vehicle is enhanced.

Figure 9:
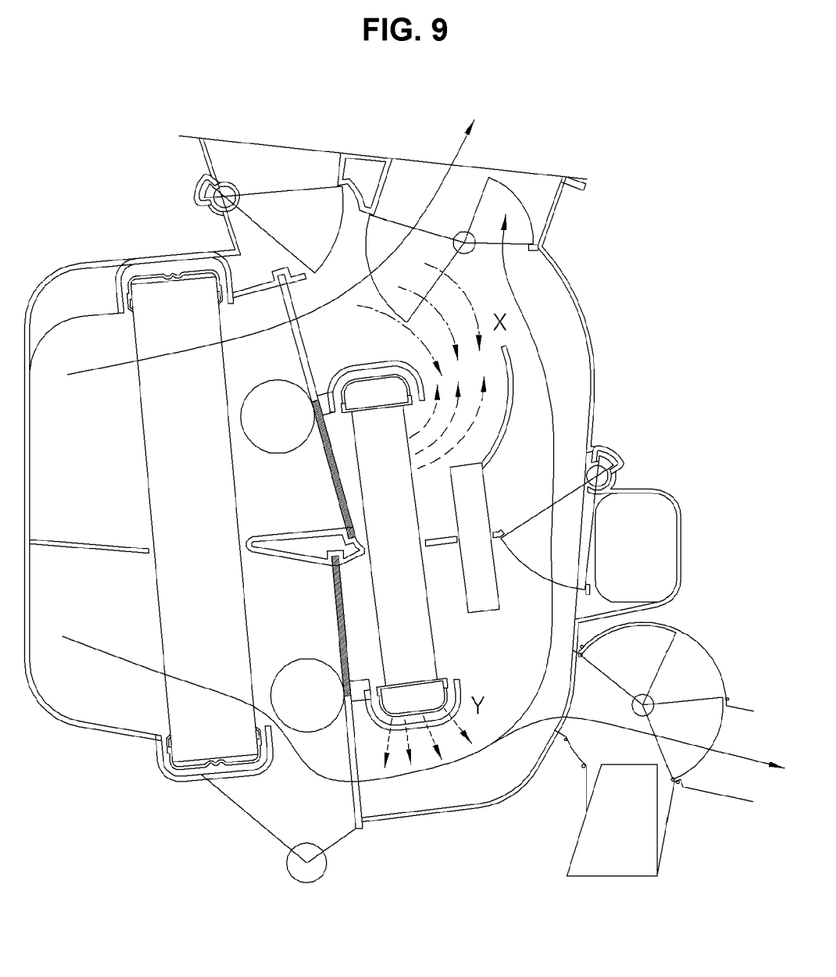
FIG. 9 is a view for illustrating effects of an HVAC apparatus for an automotive vehicle according to an exemplary embodiment of the present invention.

On the other hand, the heat exchanger 120 is provided with partition walls for supporting the heat exchanger 120 at its top and bottom end portions respectively. In the present case, as shown in FIG. 9, heat may be introduced into the cold air at the lower side through the partition at the bottom end portion in a zone Y.

Further, there may be a problem that heat of the heat exchanger 120 is introduced into the cold air at the upper side in a zone X, deteriorating the cooling performance.

Therefore, a backflow prevention guide 121 and a heat conduction prevention guide 122 are further disposed to the heat exchanger 120 side of the HVAC apparatus of the present invention.

The backflow prevention guide 121 has a shape configured to extend and curve upward from the partition wall at the top end portion of the heat exchanger 120 and hence configured to prohibit the cold air at the upper side from being mixed with heat generated by the heat exchanger 120.

The heat conduction prevention guide 122 is formed as a double partition wall distanced apart from the partition wall at the bottom end portion of the heat exchanger 120 and hence configured to block heat of the heat exchanger 120 wherein the heat is prevented from being mixed with the cold air at the lower side.

In the present embodiment of the present invention to which the backflow prevention guide and heat conduction prevention guide are applied, discharge temperature of the air passing through the vent was measured under the two conditions that cooling water of 10 l/min at 85° C. exists and does not exist when inlet air is 100 m$^2$/h at 0° C. As a result, difference between discharge temperatures is shown as 0.9° C., which demonstrates that the present embodiment exerts the effect of reducing heat to be introduced into the cold air.

On the other hand, the lower temperature door 151 is disposed in parallel with the heat exchanger 120, while the upper temperature door 141 is disposed in a manner of getting closer to the heat exchanger 120 as it moves further downward.

The reason that the upper temperature door 141 has such a structure is that it is advantageous to secure a region of the flow path to the front seat face vent at the maximum. Since the front seat face area rather than another area is the most important in air conditioning of the vehicle, mixing of the air in the front seat face mode can be made preferable by such arrangement, and hence air conditioning performance in the front seat face mode is exerted very well.

Figure 10:
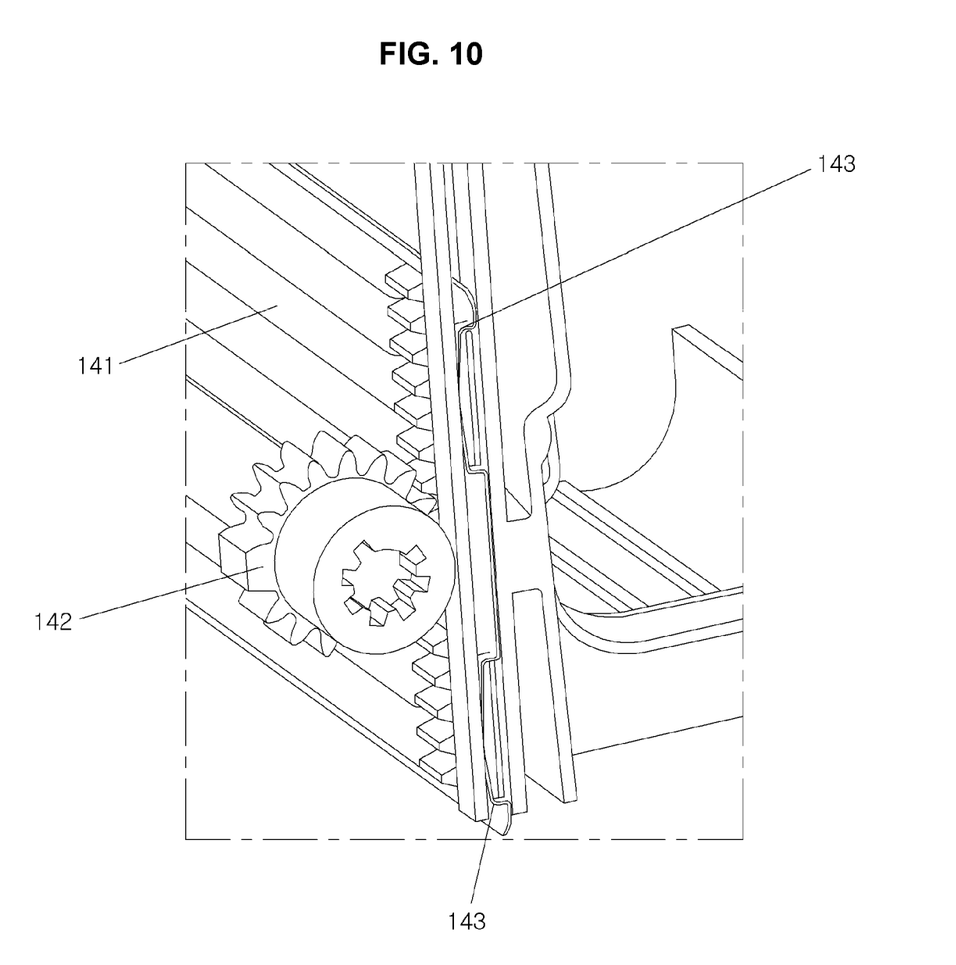
FIG. 10 is an enlarged view of various components of an HVAC apparatus for an automotive vehicle according to an exemplary embodiment of the present invention.

Further, the upper and lower temperature doors 141 and 151 are configured to be operated in a sliding manner by respective door gears 142 and 152. As shown in FIG. 10, a clearance may be generated between the temperature door and a side guide for allowing the temperature door to slide up and down, and hence vertical movement of the temperature door may not be smooth.

Therefore, in an exemplary embodiment of the present invention, an elastic guide portion 143 is formed on a first side of the temperature door.

As shown in FIG. 10, the elastic guide portion 143 has a shape protruding from a flat surface at the first side portion of the temperature door and is provided with a hole. Therefore, the elastic guide portion 143 can be operated without a clearance when moving up and down on the side guide and has an elasticity, facilitating more smooth up and down movement.

Figure 11:
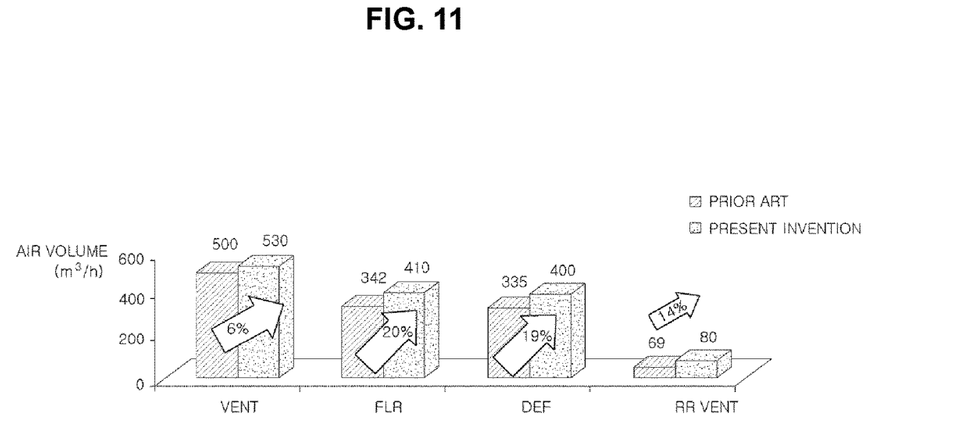
FIG. 11 is a graph for comparing air volumes obtained in an HVAC apparatus for an automotive vehicle according to an exemplary embodiment of the present invention with those in the conventional art.

As discussed above, according to the HVAC apparatus for an automotive vehicle of the present invention, it is demonstrated that an air volume is increased compared to the conventional HVAC apparatus as shown in FIG. 11.

Furthermore, since transverse double flow paths are not applied to the apparatus and the position of the heat exchanger is shifted upward, the size of the package can be reduced, making it possible to reduce the weight of components and also to reduce the manufacturing cost.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating, ventilation, and air conditioning (HVAC) apparatus for a vehicle,
    wherein an internal volume is divided into upper and lower regions, blowing the air to a defrost vent wherein a front seat face vent is made through the upper region, and blowing the air to a front seat foot vent,
    wherein a rear seat vent is made through the lower region,
    wherein cold air passing through an evaporator and warm air passing through a heat exchanger are mixed in each of the upper and lower regions, and
    wherein a horizontal partition wall is configured to divide the internal volume into the upper and lower regions and is formed at a height at which the heat exchanger is bisected, to guide the air into the upper region and the lower region, respectively.

2. The HVAC apparatus according to claim 1, further including an upper temperature door disposed at a front end portion of the heat exchanger in the upper region configured to regulate an inflow of air into the heat exchanger, and a lower temperature door disposed at the front end portion of the heat exchanger in the lower region configured to regulate an inflow of air into the heat exchanger.

3. The HVAC apparatus according to claim 2, wherein the upper and lower temperature doors are configured to slide in an upward and downward direction to open or close a flow path to the heat exchanger.

4. The HVAC apparatus according to claim 3, wherein the upper temperature door is closer to the heat exchanger as the upper temperature door moves further downward therefrom.

5. The HVAC apparatus according to claim 4, wherein the upper and lower temperature doors are formed at sides thereof with elastic guide portions respectively configured to eliminate a clearance between the temperature door and a guide for guiding the temperature door up and down.

6. The HVAC apparatus according to claim 5, wherein the elastic guide portions are formed to be protruded and have a hole formed therein.

7. The HVAC apparatus according to claim 3, wherein partition walls of supporting the heat exchanger are formed at top and bottom end portions of the heat exchanger, and wherein the apparatus further includes a backflow prevention guide formed to extend and curve upward from the partition wall at the top end portion thereof.

8. The HVAC apparatus according to claim 7, further including a heat conduction prevention guide formed to be separated from the partition walls at the bottom end portion and configured to prevent heat of the heat exchanger from being transferred to a lower side thereof.

9. A heating, ventilation, and air conditioning (HVAC) apparatus for a vehicle, in which an internal volume in which an evaporator and a heat exchanger are disposed is formed, a horizontal partition wall for partitioning the internal volume into upper and lower regions is formed, and cold air passing through the evaporator and warm air passing through the heat exchanger are mixed in each of the upper and lower regions independently, wherein the apparatus includes:
    an upper temperature door disposed at a front end portion of the heat exchanger in the upper region and configured to regulate an inflow of air into the heat exchanger;
    a lower temperature door disposed at the front end portion of the heat exchanger in the lower region and configured to regulate an inflow of air into the heat exchanger;
    a defrost door configured for adjusting blowing of the air to a defrost vent;
    a front seat face door configured for adjusting blowing of the air to a front seat face vent; and
    a rear seat door configured for adjusting blowing of the air to a rear seat vent.

10. The HVAC apparatus according to claim 9, wherein the upper temperature door is closer to the heat exchanger as the upper temperature door moves further downward therefrom.

11. The HVAC apparatus according to claim 10, wherein the upper and lower temperature doors are formed at sides thereof with elastic guide portions respectively configured to eliminate a clearance between the temperature door and a guide for guiding the temperature door up and down and wherein the elastic guide portions are formed to be protruded and have a hole formed therein.

12. The HVAC apparatus according to claim 11, wherein partition walls of supporting the heat exchanger are formed at top and bottom end portions of the heat exchanger, and wherein the apparatus further includes a backflow prevention guide formed to extend and curve upward from the partition wall at the top end portion thereof, and a heat conduction prevention guide formed to be separated from the partition walls at the bottom end portion and configured to prevent heat of the heat exchanger from being transferred to a lower side.

13. The HVAC apparatus according to claim 1, wherein the heat exchanger is configured as a heater.

14. The HVAC apparatus according to claim 9, wherein the heat exchanger is configured as a heater.

* * * * *